Figure 1:
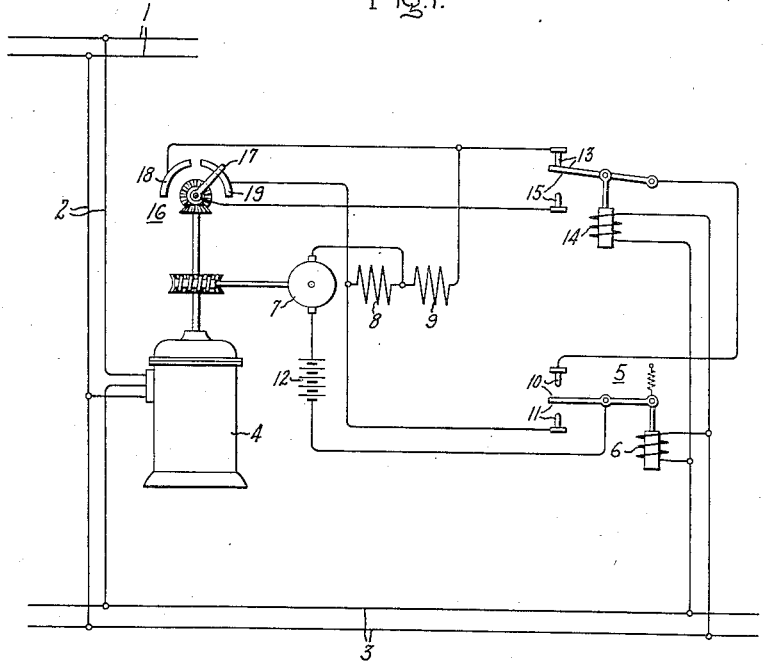

July 16, 1935.   F. J. CHAMPLIN   2,008,542

REGULATOR CONTROL SYSTEM

Filed June 23, 1934

Inventor:
Franklin J. Champlin,
by Harry E. Dunham
His Attorney.

Patented July 16, 1935

2,008,542

UNITED STATES PATENT OFFICE 2,008,542

REGULATOR CONTROL SYSTEM

Franklin J. Champlin, Dalton, Mass., assignor to General Electric Company, a corporation of New York Application June 23, 1934, Serial No. 732,053

4 Claims. (Cl. 171—119)

My invention relates to regulator control systems and more particularly to an improved automatic control system for induction voltage regulators.

An induction voltage regulator is essentially a transformer whose voltage ratio is made variable by relatively rotating its primary and secondary windings. When the windings are in a given relative position a maximum voltage in one direction is induced in the secondary winding, while if the movable winding is rotated 180 electrical degrees a maximum voltage in the other direction is induced in the secondary winding. These two positions of the regulator are referred to as the positions of maximum boost and maximum lower because when the regulator is connected in a circuit, the regulator voltage either adds to or subtracts from the circuit voltage in these two positions. When the normally movable winding is rotated only 90 electrical degrees the regulator is in its so-called neutral position and no voltage is induced in the secondary winding.

Induction voltage regulators are usually connected to the circuit to be regulated in such a manner that the secondary winding is in series in the circuit to be regulated and the primary winding is connected in shunt with the circuit to be regulated. The regulator is usually operated by a reversible operating motor whose direction of rotation is controlled by a voltage responsive circuit controller of the type known to the art as a contact making voltmeter.

In accordance with my invention, I provide automatic means responsive to a predetermined abnormal condition of the regulated circuit for automatically placing the regulator as near to its neutral position as is practical, regardless of what other position it may be in at the time the abnormal condition occurs. The predetermined abnormal condition may be loss of voltage on the regulated circuit, such as is caused by a short circuit thereon. Such control of the regulator produces a number of desirable results. One such result is that when voltage is again restored on the regulated circuit the regulator will be in its theroretical normal or average position so that on the average it should require but little motion from this position in order to restore the circuit voltage to its regulated normal value. Another advantageous result is that when the regulator is near its neutral position, the mechanical torque which is produced in the regulator is less than when the regulator is in any other position except those of exact maximum boost or lower and, as will be explained later, it is practically impossible to stop a regulator exactly at either of its "maximum" positions. Mechanical torque is produced in an induction regulator in a manner similar to the way torque is developed in an induction motor and when short circuit currents are passed through the regulator this torque sometimes attains very high values and not infrequently results in injury to the regulator and its operating mechanism. Still a further advantageous result is that when the regulator is at or near its neutral position, its through impedance is higher than when it is at or near either of its extreme positions, so that when the regulator is at or near its neutral position it is more effective in limiting short circuit currents than when it is at or near its extreme position.

I am aware that devices known to the art as low voltage cutouts have been employed in connection with the control of induction voltage regulators. These cutouts are simply undervoltage relays which heretofore have served to reverse the connections between the contact making voltmeter and the operating motor when the voltage of the regulated circuit is below a predetermined value, with the result that the regulator is then run approximately to its maximum voltage lowering position, whereas without the low voltage cutout the ordinary action of the contact making voltmeter would be such as to run the regulator to its maximum voltage boosting position in its attempt to maintain the circuit voltage at its normal value. The theory behind this has been that if the regulator is allowed to be run to its maximum voltage boosting position on undervoltage, then a subsequent restoration of voltage will result in a momentary excessively high voltage on the regulated circuit, and this high voltage may injure certain load devices, such for example, as incandescent lamps. Consequently, it was thought that maximum safety would be secured by running the regulator to its maximum lowering position on undervoltage. However, due to differences in limit switches, regulator speeds, inertias, etc., it is, as a practical matter, impossible to stop a regulator exactly on its maximum lowering position and in the past regulators have been destroyed due to the excessively high torques developed therein, by short circuit currents, when they are near their maximum lowering positions. In my invention, however, this difficulty is overcome and at the same time, the regulator is prevented from going to its maximum boosting position so that these is no danger of having momentary excessively high voltage on the regulated circuit upon the return of circuit voltage.

An object of my invention is to provide a new and improved regulator control system.

Another object of my invention is to provide a new and improved undervoltage protective control system for induction voltage regulators.

My invention will be better understood from the following description taken in connection with the accompanying drawing and its scope will be pointed out in the appended claims.

Figure 2:
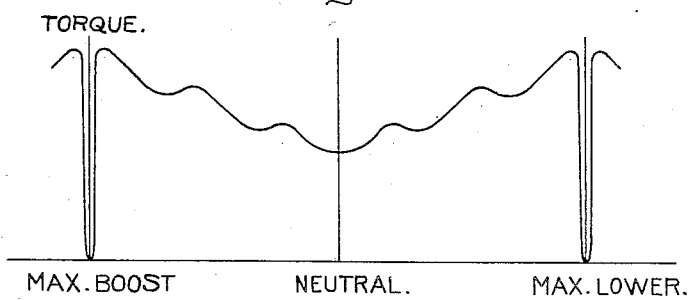

In the drawing, Fig. 1 is a diagrammatic view of an embodiment of my invention and Fig. 2 is a regulator torque-position curve for showing that maximum torques are developed just off the "maximum" positions.

Referring now to Fig. 1 of the accompanying drawing wherein I have shown my invention as applied to an electrical distribution system comprising an alternating current supply circuit 1 which energizes a feeder circuit 2 for a load circuit 3. Connected in the feeder circuit 2 is an induction voltage regulator 4 which is arranged to be controlled by a contact making voltmeter 5 having an operating winding 6 connected to respond to the voltage of circuit 3. Regulator 4 is arranged to be operated by a reversible operating motor 7 which is provided with reversing field windings 8 and 9, respectively. Contact making voltmeter 5 is provided with a set of so-called "raise" contacts 10 and a set of so-called "lower" contacts 11 for controlling the energization of motor 7 through the reversing field windings 9 and 8, respectively. Any suitable source of current supply may be provided for energizing the motor 7 and as shown, there is illustrated a battery 12 for this purpose. The operating circuit, whereby contacts 10 control the motor 7 through the winding 9 is completed through a set of contacts 13 on a device which may be referred to as a low voltage cutout, and as shown this device is provided with an operating winding 14 connected to respond to the voltage of circuit 3. This device is so arranged that when the voltage of circuit 3 is above a predetermined low value the contacts 13 are closed. Whereas if the voltage of circuit 3 falls below this predetermined low value, contacts 13 open and a second set of contacts 15 on the device close.

For insuring that the regulator is run approximately to its neutral position upon the occurrence of predetermined low voltage conditions on circuit 3, I provide a neutral position switch 16, which is mechanically operated by the regulator 4 and which has a movable contact 17 for cooperation with stationary segmental contacts 18 and 19, respectively. The arrangement is such that when the regulator is in its neutral position the contact 17 is midway between the contacts 18 and 19 and is out of engagement with either of these contacts, whereas when the regulator is in any other position contact 17 is in engagement with one or the other of the contacts 18 or 19. The stationary one of the contacts 15 of the low voltage cutout is connected to the movable contact 17 of the neutral position switch and the stationary contacts 18 and 19 of this switch are connected respectively to the field windings 8 and 9 of the motor 7.

The operation of the illustrated embodiment of my invention is as follows: With the parts in the positions shown in the drawing the voltage on circuit 3 is normal, for neither of the contacts 10 or 11 of the contact making voltmeter are closed. If the voltage should rise above normal the energization of winding 6 would increase sufficiently to close the contacts 11, whereby a circuit is completed for the motor 7 through the battery 12 and field winding 8, thereby causing the motor 7 to operate in such a direction as to lower the voltage of circuit 3. If now the voltage of circuit 3 should fall slightly below normal the contacts 10 of the meter 5 would close thereby completing a circuit from the battery 12 through the contacts 10, the contacts 13 of the low voltage cutout and the field winding 9 of the motor 7 whereby the motor is reversed and the regulator is rotated in such a direction as to raise the voltage.

Assume now that a short circuit occurs on circuit 3 or circuit 2, or that for any other reason the voltage of circuit 3 falls below the predetermined value at which the low voltage cutout operates. Under these conditions the contacts 10 of the contact making voltmeter 5 close but also the contacts 13 of the low voltage cutout open and the contacts 15 thereof close. Due to the fact that the contacts 13 open the circuit for energizing the motor 7 through the field winding 9 is broken so that this motor cannot operate in a direction to cause the regulator to be moved to its maximum boost or raising position. However, the closure of the contacts 15 completes a circuit from the battery 12, through the contacts 10 and the contacts 15 in series, to the movable contact 17 of the neutral position switch and from there the circuit is completed through the segmental contact 19 and the field winding 8 and through the motor back to the battery. Neutral position switch 16 is so arranged that when the contact 17 engages the contact 19 the regulator is in a position on the boosting side of its neutral position. Consequently, when the circuit through the contacts 17 and 19 to the field winding 8 is completed, the regulator motor operates in such a direction as to cause the regulator to move in a voltage lowering direction until the contact 17 leaves the contact 19 whereupon the regulator will be substantially in its neutral position. Should the regulator have been on the lowering side of its neutral position the contact 17 would have been in engagement with the contact 18 and as the contact 18 is connected to the field winding 9 the motor would have been operated in the opposite direction, that is, in a raising direction until it reached its neutral position.

Upon restoration of the circuit voltage, the low voltage cutout again opens its contacts 15 and closed contacts 13 whereby the motor 7 is again completely under the control of contact making voltmeter 5 and the regulating system operates in the conventional manner to hold substantially constant voltage.

From Fig. 2, which is illustrative of relative torque values rather than actual torque values, it will be seen that the torque-position curve of a regulator is steepest just off its maximum positions, and that it is relatively low and flat near the neutral position. This explains why slight inaccuracies in stopping the regulator at its maximum lowering position result in much higher torque than similar inaccuracies in stopping the regulator at its neutral position.

While I have shown and described a particular embodiment of my invention, it will be obvious to those skilled in the art that various changes and modifications may be made therein without departing from my invention, and I, therefore, aim in the appended claims to cover all such changes and modifications as fall within the true spirit and scope of my invention.

What I claim as new and desire to secure by Letters Patent of the United States, is,—

1. In combination, an electric circuit, an induction voltage regulator connected thereto, said regulator having a neutral position, means for controlling said regulator in response to the voltage of said circuit, and means responsive to a predetermined abnormal condition of said circuit for putting said regulator substantially in its neutral position regardless of what other position it may be in when said abnormal condition occurs.

2. In combination, a voltage regulating system including an induction voltage regulator having a neutral position, and means responsive to predetermined low voltage condition of said system for automatically placing said regulator substantially in its neutral position regardless of what other position it may be in when said low voltage condition occurs.

3. In combination, an alternating current circuit, an induction voltage regulator connected thereto, a neutral position switch for said regulator, a contact making voltmeter for controlling said regulator, and a low voltage cutout connected to control said regulator through said neutral position switch.

4. In combination, an electric circuit, means including a rotatable member arranged to be operated in either direction from a neutral position between predetermined operating limits for controlling an electrical characteristic of said circuit, operating means responsive to said electrical characteristic for normally controlling the operation of said rotatable member between its operating limits, and means responsive to a value of said electrical characteristic below a predetermined value and operative jointly with said operating means for operating said rotatable member to its neutral position.

FRANKLIN J. CHAMPLIN.